United States Patent
Kim et al.

(10) Patent No.: US 10,882,752 B2
(45) Date of Patent: Jan. 5, 2021

(54) METHOD FOR PRODUCING SYNTHETIC HECTORITE AT LOW TEMPERATURE AND ATMOSPHERIC PRESSURE

(71) Applicant: LG CHEM, LTD., Seoul (KR)

(72) Inventors: Jong Hun Kim, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 73 days.

(21) Appl. No.: 16/074,411

(22) PCT Filed: Sep. 29, 2017

(86) PCT No.: PCT/KR2017/011053
§ 371 (c)(1),
(2) Date: Jul. 31, 2018

(87) PCT Pub. No.: WO2018/088698
PCT Pub. Date: May 17, 2018

(65) Prior Publication Data
US 2019/0135645 A1 May 9, 2019

(30) Foreign Application Priority Data

Nov. 14, 2016 (KR) .................. 10-2016-0151389

(51) Int. Cl.
*C01B 33/40* (2006.01)
*C01B 33/22* (2006.01)
(Continued)

(52) U.S. Cl.
CPC ............. *C01B 33/405* (2013.01); *B01J 21/16* (2013.01); *B01J 23/04* (2013.01); *B01J 37/031* (2013.01);
(Continued)

(58) Field of Classification Search
CPC ........ C01B 33/22; C01B 33/32; C01B 33/405; B01J 2523/00; B01J 2523/11;
(Continued)

(56) References Cited

U.S. PATENT DOCUMENTS 3,586,478 A * 6/1971 Neumann .............. D21H 23/00
423/331
3,671,190 A   6/1972 Neumann
(Continued)

FOREIGN PATENT DOCUMENTS

CN    103204511   7/2013
EP    0889004     1/1999
(Continued)

OTHER PUBLICATIONS

Jang et al. "Synthesis of Hectorite by Hydrothemal Method," J. Miner. Soc. Korea 20(1):1-6 (2007). (English Language Abstract provided).
(Continued)

*Primary Examiner* — Ngoc-Yen Nguyen
(74) *Attorney, Agent, or Firm* — Dentons US LLP

(57) ABSTRACT

The present invention relates to a low-temperature/atmospheric-pressure method for producing synthetic hectorite and synthetic hectorite produced using the same, and more particularly, provides a method for producing synthetic hectorite at a low temperature and atmospheric pressure and synthetic hectorite produced using the same such that: a crystallization reaction may be carried out under a low-temperature/atmospheric-pressure condition by introducing a step of forming a precipitate and using a weak basic catalyst when the Li—Mg precipitates are formed; a reaction time may be reduced; synthetic hectorite with excellent
(Continued)

major application properties may be prepared; and the properties may be easily controlled by controlling a composition ratio of a reactant.

8 Claims, 3 Drawing Sheets

(51) Int. Cl.
 B01J 23/04 (2006.01)
 B01J 21/16 (2006.01)
 B01J 37/03 (2006.01)
 C01B 33/32 (2006.01)
(52) U.S. Cl.
 CPC .............. *C01B 33/22* (2013.01); *C01B 33/32* (2013.01); *B01J 2523/00* (2013.01); *C01P 2006/22* (2013.01); *C01P 2006/60* (2013.01)
(58) Field of Classification Search
 CPC .... B01J 2523/22; B01J 2523/41; B01J 21/16; B01J 23/04; B01J 37/031; C01P 2006/22; C01P 2006/60
 See application file for complete search history.

(56) References Cited

U.S. PATENT DOCUMENTS

| 3,954,943 | A | | 5/1976 | Neumann et al. |
|---|---|---|---|---|
| 4,049,780 | A | * | 9/1977 | Neumann ............. C01B 33/405 423/331 |
| 4,054,537 | A | | 10/1977 | Wright et al. |
| 2006/0147367 | A1 | | 7/2006 | Temperly et al. |

FOREIGN PATENT DOCUMENTS

| GB | 1432770 | 4/1976 |
|---|---|---|
| KR | 10-0748211 | 8/2007 |

OTHER PUBLICATIONS

Torii, K. and T. Iwasaki, "Synthesis of New Trioctaherdral Mg-Smectite," Chemistry Letters pp. 2021-2024 (1986).

* cited by examiner

METHOD FOR PRODUCING SYNTHETIC HECTORITE AT LOW TEMPERATURE AND ATMOSPHERIC PRESSURE

CROSS-REFERENCE TO RELATED APPLICATIONS

This application is a National Stage Application of International Application No. PCT/KR2017/011053 filed on Sep. 29, 2017, which claims priority to and the benefit of Korean Patent Application No. 10-2016-0151389, filed on Nov. 14, 2016, in the Korean Intellectual Property Office, the disclosure of which is incorporated herein in its entirety by reference for all purposes as if fully set forth herein.

TECHNICAL FIELD

The present invention relates to a method for producing synthetic hectorite at a low temperature and atmospheric pressure and synthetic hectorite produced using the same.

BACKGROUND ART

Rapid industrial development demands substances having various kinds of characteristics. In particular, global interest in nano-technology has led to research focused on a clay mineral having the smallest particle size from among minerals present in nature.

Among these, hectorite is a clay mineral belonging to the saponite subgroup from among smectite group which belongs to the 2:1 layer type from among a rough classification of clay minerals. The saponite subgroup includes hectorite and saponite. Similarly to montmorillonite, a weak layer charges are generated in hectorite by substituting $Li^+$ for $Mg^{2+}$ on an octahedral plate, and these layer charges cause expanding or swelling property. This weakness of interlayer binding force means that the binding force of positive ions present between layers is not so large enough to firmly bind the 2:1 layer, and further, hectorite is easily swelled due to affinity with water.

Hectorite is a clay mineral which has a layered crystalline structure, very small particle sizes (20-30 nm), and a high swelling property and thickening capacity. In particular, since showing a light color and containing no iron, hectorite is a harmless mineral with no color change. Due to such characteristics, hectorite is being used in various fields, such as a material of paint exhibiting a long-term anti-smell effect, a suspended solid, a stabilizer for emulsion, a cosmetic material, and a medicine for allergy. Table 1 below shows the characteristics of hectorite.

TABLE 1

Properties of hectorite (http://webmineral.com/data/Hectorite.shtml)

| | |
|---|---|
| Chemical Composition | $Na_{0.4}(Mg_{5.5}Li_{0.4})Si_{7.9}O_{20}(OH.F)_4 \cdot nH_2O$ |
| Crystal System | Monoclinic(S.G.: C2/m) |
| Cleavage | [001] Perfect |
| Color | White |
| Density | 2~3 (average 2.5) |
| Diaphaniety | Translucent Opaque |
| Fracture | Uneven |
| Habit | Aggregates |
| Hardness | 1~2 |
| Luminescence | Fluorescent |
| Luster | Earthy [Dull] |
| Streak | White |

At present, commercialized products include Laponite of BYK Co. and synthetic hectorite produced by Kunimine Industries Co. in Japan.

Since a hectorite-specific aqueous solution property is shown due to crystalline defects formed by ion exchanges between $Mg^{2+}$ and $Li^+$ in a magnesium silicate-based layered structure, synthetic hectorite is being generally produced under a high-temperature/high-pressure reaction condition to form a crystalline phase. However, expensive production equipment and accompanying complicated production processes are required due to the high-temperature/high-pressure reaction condition. In addition, since hectorite particles produced at 100° C. or lower are known to be not swollen with water, various kinds of research on production processes have been carried out to solve this using a low-temperature, atmospheric-pressure reaction condition, but a long reaction time such as 60-100 hours is required, and thus, such production processes have limitations of being difficult to be applied to actual processes.

In related arts, since application to various material industries is difficult due to such limitations, a demand for a new production process which is easy and economical arose, and accordingly, a new, easy, economical method for producing synthetic hectorite while maintaining properties of existing synthetic hectorite has been developed.

Prior Art Document (Patent document 1) Korean Patent Publication No. 10-0748211 (Aug. 9, 2007)

DISCLOSURE OF THE INVENTION

Technical Problem

An aspect of the present invention provides a simple, economical method for producing synthetic hectorite such that a crystallization reaction may be carried out under a low-temperature/atmospheric-pressure condition by introducing a step of forming a Li—Mg precipitate.

Another aspect of the present invention provides a method for producing synthetic hectorite such that in the step of forming Li—Mg precipitates, a weak basic catalyst and a strong basic catalyst are mixedly used, and thus, pH may be easily controlled, and a reaction time may be further reduced.

Still another aspect of the present invention provides a method for producing synthetic hectorite the propertied of which are easily controlled by controlling composition ratios of reactants.

Yet still another aspect of the present invention provides synthetic hectorite produced by the method for producing synthetic hectorite and having excellent properties such as dispersibility, swellability, and light transmittance.

Technical Solution

According to an aspect of the present invention, there is provided
a method for producing synthetic hectorite, the method including the steps of: 1) preparing a precursor solution mixture including a lithium (Li) precursor, a fluorine (F) precursor, and a magnesium (Mg) precursor; 2) adding a basic catalyst into the precursor solution mixture and forming a Li—Mg precipitate; and 3) adding a silica (Si) precursor to the Li—Mg precipitate and carrying out a crystallization reaction.

The basic catalyst may be used as a mixture of a strong base and a weak base.

In addition, the present invention provides synthetic hectorite produced by the producing method and expressed by Formula 1 below.

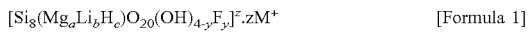

(In Formula 1, 4.9≤a≤5.7, 0<b≤1.05, 0<c<2, 5<(a+b+c)<8, 0<y<1, z=12-2a-b-c, and M is sodium (Na) or lithium (Li).)

Advantageous Effects

A low-temperature, atmospheric-pressure method for producing synthetic hectorite according to the present invention allows a crystallization reaction to be carried out under a low-temperature/atmospheric-pressure condition by introducing a step of forming a precipitate prior to the crystallization reaction. Thus, a high-temperature, high-pressure reaction condition is not required, and therefore, expensive production equipment and accompanying complicated processes are not required, and since hectorite may be produced through a simple, economical process in a short time, production cost reduction and a remarkable increase in production efficiency may be achieved.

In addition, in the present invention, a weak basic catalyst and a strong basic catalyst are mixedly used, and thus, an easy adjustment of pH may be achieved, and a reaction time may further be reduced.

In addition, the low-temperature, atmospheric-pressure method for producing synthetic hectorite according to the present invention controls composition ratios of reactants, and thus, may easily control the major application properties of synthetic hectorite, such as dispensability, swellability, and light transmittance.

In addition, the low-temperature, atmospheric-pressure method for producing synthetic hectorite according to the present invention may manufacture hectorite having excellent properties such as dispensability, swellability, and light transmittance even when the synthetic hectorite is produced under a low-temperature/atmospheric-pressure condition in a short time.

BRIEF DESCRIPTION OF DRAWINGS

The following drawings attached to the specification illustrate specific examples of the present invention, and serve to enable technical concepts of the present invention to be further understood together with detailed description of the invention given below, and therefore, the present invention should not be interpreted only with matters in such drawings.

MODE FOR CARRYING OUT THE INVENTION

Hereinafter, the present invention will be explained in more detail to assist the understanding of the present invention. Terms or words used in the specification and claims should not be interpreted as limited to a commonly used meaning or a meaning defined dictionaries, and should be interpreted as having a meaning that is consistent with their meaning in the context of the technical idea of the invention, based on the principle that an inventor may properly define the meaning of the words or terms to best explain the invention.

Hectorite particles are crystalline substances exhibiting high water dispersibility, water swellability, transparency, gel formability, and thixotropy, and are naturally found, but intracrystalline impurities are unremovable, and therefore, synthetic hectorite is being produced by using a reactant for commercial applications, such as viscosity changer, paint additive, and personal care fields. In general, synthetic hectorite is being produced under a high-temperature/high-pressure reaction condition to ensure a hectorite-specific solution-phase property shown due to crystalline defects formed through an ion exchange between $Mg^{2+}$ and $Li^+$ in a magnesium silicate-based layered structure.

However, there are limitations of an increase in production costs caused by expensive production equipment due to the high-temperature/high-pressure reaction condition and accompanying complicated production processes, a decrease in production efficiency, and stability. To solve this, the present invention provides a novel method for producing synthetic hectorite, the method being capable of producing synthetic hectorite having an excellent property in a short time using a low-temperature/atmospheric-pressure reaction condition.

A method for producing synthetic hectorite according to an embodiment of the present invention includes:

1) a step of preparing a precursor solution mixture comprising a lithium (Li) precursor, a fluorine (F) precursor, and a magnesium (Mg) precursor;

2) adding a basic catalyst into the precursor solution mixture and forming a Li—Mg precipitate; and 3) adding a silica (Si) precursor to the Li—Mg precipitate and carrying out a crystallization reaction.

The basic catalyst is characterized by being used as mixture of a strong base and a weak base.

Figure 1:
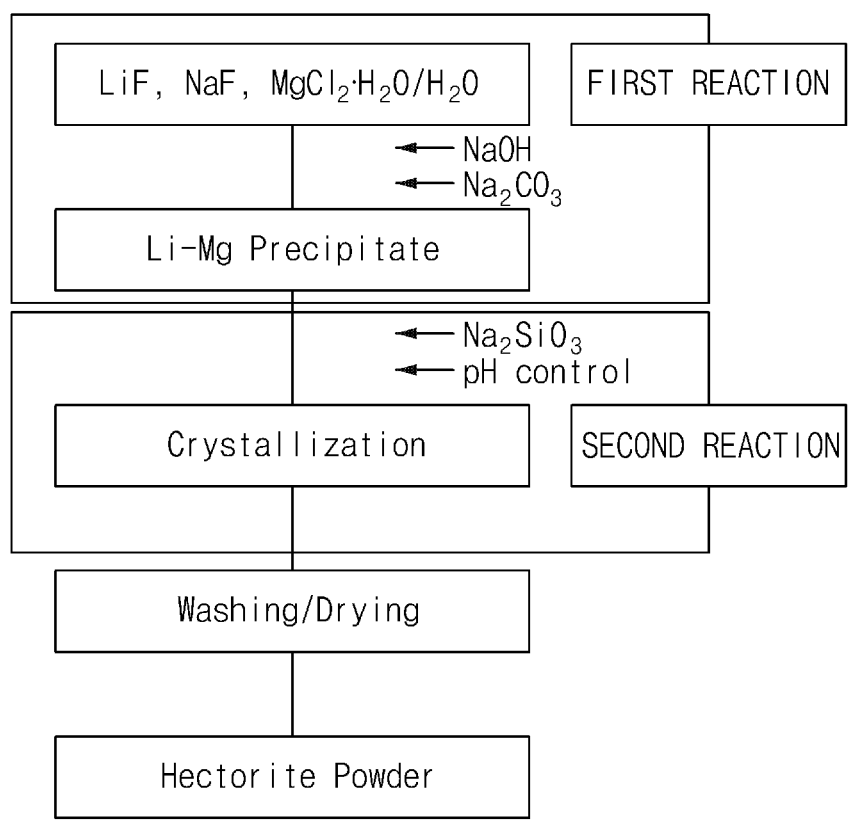
FIG. 1 is a flowchart schematically illustrating processes of a method for producing synthetic hectorite according to an embodiment of the present invention.
Figure 2:
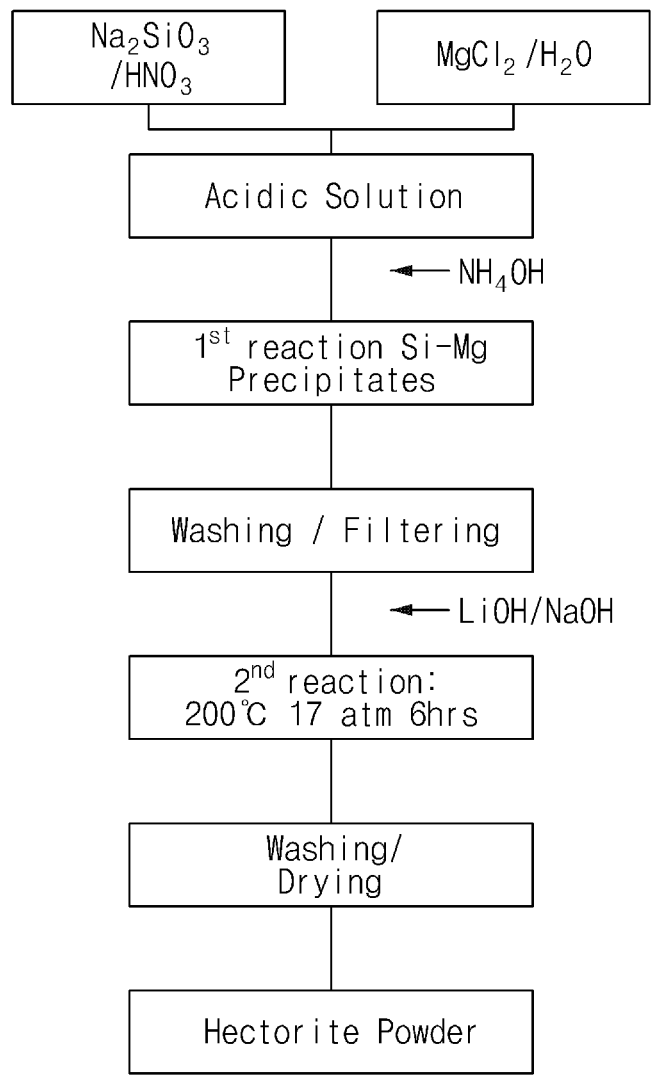
FIG. 2 is a flowchart schematically illustrating processes of a method for producing synthetic hectorite using conventional high-temperature/high-pressure processes according to comparative example 1 of the present invention.
Figure 3:
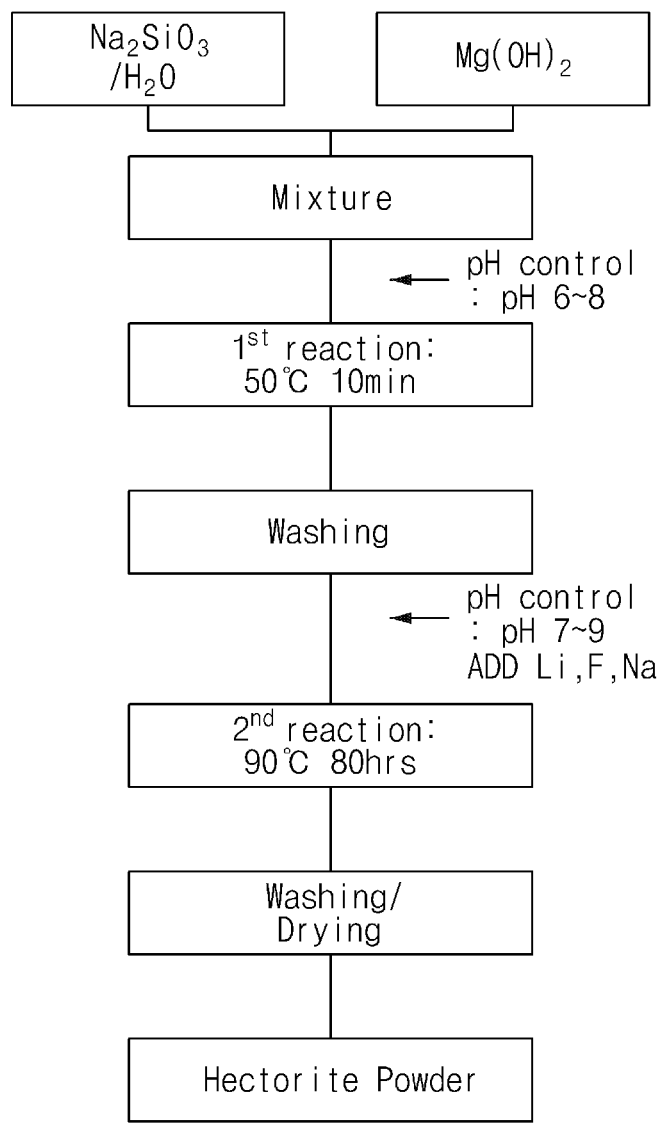
FIG. 3 is a flowchart schematically illustrating processes of a method for producing synthetic hectorite using conventional low-temperature/atmospheric-pressure processes according to comparative example 2 of the present invention.

Hereinafter, with reference to FIG. 1, a method for producing synthetic hectorite according to an embodiment of the present invention will be described in detail.

Step 1)

Step 1) according to an embodiment of the present invention is a step for preparing a precursor solution mixture for forming a Li—Mg precipitate, and is characterized by preparing a precursor solution mixture including a lithium (Li) precursor, a fluorine (F) precursor, and a magnesium (Mg) precursor.

The precursor solution mixture of the present invention is prepared for firstly forming the Li—Mg precipitate before producing hectorite, and is characterized by including no silica precursor. This is because the silica precursor has a greater reactivity to the magnesium precursor than to the lithium precursor, and therefore, when the silica precursor is further included, there is a concern that a Si—Mg precipitate is competitively formed with the Li—Mg precipitate. Accordingly, the present invention is characterized in that in order to suppress a reaction of forming the Si—Mg precipitate and only form the Li—Mg precipitate, the precursor solution mixture including the lithium (Li) precursor, fluorine (F) precursor, and magnesium (Mg) precursor is prepared. In addition, a Li—Mg—Si complex precipitate is formed by a crystalline reaction with a silica precursor which is added after the formation of the Li—Mg precipitate, and thus, synthetic hectorite may be prepared.

In the present invention, a precursor means a substance before being changed into a specific substance in a reaction, and means a substance before being changed into a specific substance which may be finally obtained in a chemical reaction or the like.

As the lithium (Li) precursor which may be used to manufacture the precursor solution mixture, one or more selected from the group consisting of lithium fluoride (LiF), lithium hydroxide (LiOH), lithium chloride (LiCl), lithium carbonate ($Li_2CO_3$), and lithium sulfate ($Li_2SO_4$) may be used, and more specifically, lithium fluoride (LiF) may be used. In the present invention, the lithium precursor firstly forms the Li—Mg precipitates and consequently serves as a raw material of $Li^+$ which substitutes $Mg^{2+}$ in the octahedron of hectorite, and lithium fluoride is particularly used because lithium fluoride is more effective for a hectorite crystallization reaction.

In addition, fluorine precursors which can be used to manufacture the precursor solution mixture of the present invention includes one or more selected from the group consisting of hydrofluoric acid (HF), sodium fluoride (NaF), fluosilicic acid ($(H_3O)_2[SiF_6]$), and sodium silico fluoride ($Na_2[SiF_6]$), and more specifically, sodium fluoride may be used. In the present invention, the fluorine precursor functions to promote the hectorite crystallization reaction, and sodium fluoride is used because a reaction, in which Li—Mg precipitates progress into Si—Mg precipitates, is suppressed by excess $Na^+$, and the selectivity of a reaction of forming Li—Mg—Si precipitates may be improved.

In addition, magnesium precursors which can be used to manufacture the precursor solution mixture of the present invention includes one or more selected from the group consisting of magnesium carbonate ($MgCO_3$), magnesium sulfate ($MgSO_4$), magnesium chloride ($MgCl_2$), and magnesium hydroxide ($Mg(OH)_2$), and more specifically, magnesium chloride ($MgCl_2$) may be used. In the present invention, the magnesium precursor should firstly form Li—Mg precipitates and react with a silica precursor added later to form Li—Mg—Si complex precipitates, and magnesium chloride is most favorable in consideration of reactivity with Si, a purchase price and purchase availability, solubility to an aqueous solution, and ease of adjusting pH of aqueous solution, and the like.

In addition, according to an embodiment of the present invention, the molar ratios of the lithium precursor and the fluorine precursor are characterized to be 1:1 to 1:10, more specifically, 1:1 to 1:5. This is because major application properties of synthetic hectorite, such as dispensability, light transmittance, and swellability, may be controlled by adjusting the molar ratios of the lithium precursor and the fluorine precursor.

Specifically, when the molar ratios of the lithium precursor is out of the above-mentioned numerical range and is too small, the Li—Mg precipitates may not be easily formed, and the amount of $Li^+$ which may substitute $Mg^{2+}$ of synthetic hectorite is reduced, and thus, the properties such as water dispensability or swellability may not be satisfactory. In addition, when the molar ratios of the lithium precursor is out of the above-mentioned numerical range and is too excessive, the reactivity improving effect due to the fluorine precursor is decreased, and there may be a limitation in that the purpose of the present invention to manufacture synthetic hectorite in a short time under a low-temperature/high-pressure condition.

Step 2)

Step 2) according to an embodiment of the present invention is a step for forming the Li—Mg precipitates, and is characterized by adding a basic catalyst into a precursor solution mixture including a lithium precursor, a fluorine precursor, and a magnesium precursor.

In the present invention, this step, in which synthetic hectorite is not directly produced, but Li—Mg precipitates are firstly formed, is a step for improving a general high-temperature/high-pressure crystallization reaction process in related arts into a low-temperature/atmospheric-pressure crystallization reaction condition so as to allow the crystallization of synthetic hectorite to be more easily performed. This step corresponds to the most characterizing step in which, in forming a layered structure of hectorite: a layered Li—Mg precipitates to be formed inside are firstly formed; a crystalline hectorite having a layered structure is then secondly synthesized through a binding reaction with a silica precursor, and a sufficient swelling occurs in an aqueous solution; and thus, major application properties of an aqueous solution of hectorite which are mainly used in an aqueous solution are secured.

The Li—Mg precipitates according to the present invention have reactivity higher than Si—Mg precipitates and thus, a crystallization reaction may easily be carried out even under a low-temperature/atmospheric-pressure reaction condition. Thus, a high-temperature/high-pressure reaction condition is unnecessary, and therefore, expensive production equipment and accompanying complicated processes are unnecessary, and since hectorite may be produced through a simple, economical process in a short time, production cost may be reduced and production efficiency may be remarkably increased.

In addition, the basic catalysts according to the present invention may be used as a mixture of a strong base and a weak base.

As in the present invention, when a strong base and a weak base are added and used to form Li—Mg precipitates, since an excessive amount of $Na^+$ is included compared to the case of using only a strong base, the reactivity of the crystallization reaction may be improved, and thus, a reaction time may remarkably be reduced to 3-10 hours compared to 20-80 hours in related preparing methods. Also, there may be an additional merit in that a pH may be more easily adjusted.

A strong base which can be used in the present invention may include one or more selected from the group consisting of sodium hydroxide (NaOH), potassium hydroxide (KOH), calcium hydroxide ($Ca(OH)_2$), and barium hydroxide ($Ba(OH)_2$), and more specifically, sodium hydroxide (NaOH) may be used in the present invention.

A weak base which can be used in the present invention may include one or more selected from the group consisting of ammonium hydroxide ($NH_4OH$), sodium carbonate ($Na_2CO_3$), and magnesium hydroxide ($Mg(OH)_2$), and more specifically, sodium carbonate ($Na_2CO_3$) may be used in the present invention.

However, when a strong base and a weak base are added and used in an appropriate range, a sufficient crystallization reaction does not occur and thus, effects of easy pH adjustment and reduction of reaction time do not appear. Thus, in the present invention, the strong base and the weak base may be added and used in a molar ratio of 1:1 to 1:10.

When an excessive amount of strong base is used compared to the above-mentioned range, there may be a drawback in that effects of easy pH adjustment and reduction of reaction time do not appear, and when an excessive amount of weak base is used compared to the above-mentioned range, there may be a drawback in that a sufficient crystallization reaction may not occur.

In particular, the effect of mixed use of the weak base may be maximized when sodium carbonate is used, as the weak base, in a mixing ratio of strong base to weak base.

In the present invention, when sodium carbonate is added and used as the weak base when Li—Mg precipitates are formed, improvement of reactivity may be derived due to an excessive amount of $Na^+$. Accordingly, in a crystallization reaction with a silica precursor to be added later, a reaction in which Si is substituted for Li to form Si—Mg precipitates is suppressed, and selectivity to a reaction in which synthetic hectorite is produced by forming Li—Mg—Si composite precipitates is increased. Thus, a long reaction time of 20-80 hours spent in existing arts may be remarkably reduced to 3-10 hours, and synthetic hectorite having a high light transmittance of 95% or higher and a wide control range of viscosity may be prepared in an aqueous solution of 2 wt %.

Meanwhile, the basic catalyst may be added in an amount such that the pH of a precursor solution mixture is 7 to 10, or more specifically, 8.5 to 10. When the basic catalyst is added in an amount which is too small or excessive to be out of the above-mentioned range, the Li—Mg precipitates may not be formed.

Meanwhile, according to an embodiment of the present invention, the Li—Mg precipitates may be formed at once by adding the basic catalyst into a precursor solution mixture which includes all of the lithium precursor, the fluorine precursor, and the magnesium precursor. However, Li precipitates may be firstly formed by adding the basic catalyst into a precursor solution mixture which includes the lithium precursor and the fluorine precursor, the magnesium precursor may then be added, and the Li—Mg precipitates may be gradually formed via a step of adjusting PH using an acidic catalyst and/or a basic catalyst.

Step 3)

Step 3) according to an embodiment of the present invention is a step for carrying out a crystallization reaction for forming Li—Mg—Si composite precipitates, that is, gel-type synthetic hectorite, and is characterized by being carried out by adding a silica (Si) precursor into the Li—Mg precipitates.

In a method for producing synthetic hectorite according to an embodiment of the present invention, unlike in the related preparing method in which Si—Mg precipitates (magnesium silicate) are formed, and then a crystallization reaction is carried out by adding a lithium precursor, Li—Mg precipitates having an excellent reactivity are firstly formed, a silica (Si) precursor is then added, and thus, a crystallization reaction may be more easily carried out in a short time even under a low-temperature/atmospheric-pressure condition.

The crystallization reaction of step 3) according to an embodiment of the present invention is characterized by being carried out at a temperature of 70-120° C., more specifically, at a temperature of 80-110° C. and under an atmospheric pressure, more specifically, under a pressure condition of 1-1.21 bar.

Meanwhile, the atmospheric pressure means a normal pressure or an atmospheric pressure, which is a pressure when the pressure is not particularly lowered or raised without using a high-pressure apparatus such as an autoclave.

In the present invention, the Li—Mg precipitates having excellent reactivity are firstly produced, and then, synthetic hectorite are secondly produced. Therefore, synthetic hectorite may be produced even under a low-temperature/ atmospheric-pressure condition compared to related methods of producing synthetic hectorite.

When the temperature of the crystallization reaction according to the present invention is 70° C. or lower, the crystallization reaction may not occur or the reaction speed is so slow that there may be a limitation in that the total process time of producing synthetic hectorite is increased. When the crystallization reaction temperature exceeds 120° C., the crystallization speed may be increased, but since the reaction is carried out in an aqueous solution phase, the reaction should be carried out under a high pressure. In this case, production costs may be increased and production efficiency may be decreased because a high-pressure and expensive equipment is required, and there may be a problem in stability caused by using a high-pressure dangerous equipment, and thus, there may be a limitation in that it is impossible to provide a simple, economical preparing method under a low temperature which is targeted by the present invention.

In addition, when the crystallization reaction according to the present invention is carried out under a pressure lower than the atmospheric pressure, the crystallization reaction may not occur, and when the reaction is carried out under a higher pressure than the atmospheric pressure, a high-pressure, expensive equipment is required, production costs may rise, and the production efficiency may be decreased. Thus, there may be a safety problem caused by using a high-pressure, dangerous equipment. Therefore, there may be a limitation in that an effect of providing a simple, economical preparing method under a low temperature which is targeted by the present invention cannot be achieved.

The method for producing synthetic hectorite is characterized in that the method may not only be produced under a low temperature/atmospheric pressure as described above, but also be produced in a short crystallization reaction time of 3-10 hours.

Most of the total process time for producing synthetic hectorite is the time required for the crystallization reaction step. Therefore, when the time required for the crystallization reaction step is reduced, the total process time required for producing synthetic hectorite may be reduced, and thus, the production efficiency of synthetic hectorite may be maximized.

Silica precursor which can be used in the present invention may indicate a diluted solution in which distilled water is added into water glass and mixed, and the water glass may be sodium silicate ($Na_2SiO_3$) which is an alkali silicate salt which is obtained by melting silicon dioxide silicate No. 3 (KS) of Youngil Chemical Co., Ltd may be used. In addition, a water glass solution used in the present invention may contain 20-40 wt %, and more specifically, 28-30 wt % of silicon dioxide ($SiO_2$).

According to an embodiment, the silica precursor and the magnesium precursor are characterized by being added in a molar ratio of 2:1 to 1:1 according to the stoichiometry of synthetic hectorite.

According to an embodiment of the present invention, in order to allow a crystallization reaction between the Li—Mg precipitates and the silicon precursor, the pH of a reaction solution needs to be adjusted by adding an acidic catalyst or a basic catalyst. In the present invention, the acidic catalysts to be used may include one or more selected from the group consisting of hydrochloric acid, nitric acid, acetic acid, and sulfuric acid, and more specifically, hydrochloric acid may be used, and the basic catalyst is as described above. In addition, the acidic catalyst or the basic catalyst may be added in an amount of a degree by which the crystallization reaction may occur, that is, in an amount such that the pH of the reaction solution becomes 8.5 to 10.

In addition, according to an embodiment, the method for producing synthetic hectorite of the present invention is characterized by passing through no washing or filtering step prior to the crystallization reaction of step 3).

In order to induce an improvement in reactivity of a crystallization reaction according to addition of an Li precursor after the formation of the Si—Mg precipitates, a high-temperature/high-pressure preparing method and low-temperature/atmospheric-pressure preparing method of related arts required a two-step washing and/or filtering process prior to the crystallization reaction as a process for removing excess salt of $Na^+$, $Cl^-$, or the like.

However, as the preparing method of the present invention introduces a step of forming the Li—Mg precipitates, reactivity is increased, and the crystallization reaction is possible even in the presence of an excess salt. Thus, the preparing method of the present invention is characterized in that it is unnecessary to pass through an excess salt removing step, and synthetic hectorite may be produced through a one-pot reaction and therefore be produced within a total process time of 3 to 10 hours.

In addition, according to an embodiment of the present invention, the method for producing synthetic hectorite of the present invention may further include step 4) of performing washing and drying after the crystallization reaction.

Step 4) is the step for removing impurities or excess salts and drying gel-type synthetic hectorite, thereby producing powder-type synthetic hectorite, and is characterized in that washing and drying are carried out after the crystallization step.

A reaction solution which includes the gel-type synthetic hectorite may contain a great amount of unreacted precursor materials, by-products, or salts of $Na^+$, $Cl^-$, or the like. Accordingly, to increase the purity of synthetic hectorite, a step of washing by using a washing solution may be carried out.

As a solvent which may be used in the present invention, a non-polar organic solvent, such as distilled water, isopropyl alcohol, hexane, heptane, xylene, or cyclohexane, may be used, and more specifically, distilled water may be used in the present invention.

In addition, after the washing, a filtering step of separating solid/liquid in a moisture content of 100% or less may further be carried out, and the washing and drying steps are repeated one to three times and may thereby improve the purity of synthetic hectorite.

After the washing and filtering step, a step may further be carried out, in which the gel-type synthetic hectorite is separated by centrifugation or dried by using a press filter, and powder-type synthetic hectorite may be produced, and after the drying, the synthetic hectorite is pulverized so as to have desired particle diameters according to purposes of use.

In addition, the present invention provides synthetic hectorite which is produced by the preparing method of the present invention and is expressed by Formula 1 below.

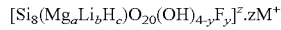   [Formula 1]

(In Formula 1, 4.9≤a≤5.7, 0<b≤1.05, 0<c<2, 5<(a+b+c)<8, 0<y<1, z=12-2a-b-c, and M is sodium (Na) or lithium (Li).)

In addition, unlike the synthetic hectorite which is produced by a related low-temperature preparing method and is not swollen by water, the hectorite of the present invention is characterized by having excellent swellability and dispensability and exhibiting light transmittance of 95% or more in an aqueous solution of 2 wt %, and viscosity of 1.2-900 cP.

The viscosity was measured by using a DV3T viscometer (Spindle LV2) from Brookfield Co. after dispersing using a 500 rpm magnetic stirrer for 6-24 hours.

Synthetic hectorite is applied mainly in an aqueous solution phase, and dispersibility according to a measurement of light transmittance and a viscosity change in an aqueous solution over time are applied as major properties. In general, the hectorite produced at 100° C. or lower is known to be not dispersed and not swollen in water even though exhibiting a hectorite-specific crystalline phase. (Torri et al. 1986, Torii, 1996).

However, the method for producing synthetic hectorite according to the present invention is characterized in that: major properties thereof may be adjusted by adjusting the ratio of Li and F; Li—Mg precipitates are firstly formed, and then, a composite crystallization reaction with a silica precursor is secondly induced, so that a reaction time is short, the processes are simple, but nevertheless, water dispersibility measured as light transmittance of 95% or more in an aqueous solution of 2 wt % is excellent; and an viscosity increasing effect may be controlled from a low viscosity to a high viscosity.

Hereinafter, exemplary embodiments of the present invention will be described in detail so as to be easily implemented by those skilled in the art. The present disclosure may, however, be embodied in different forms and should not be construed as limited to the embodiments described herein.

Example 1

NaOH as a strong base and $Na_2CO_3$ as a weak base were added in an amount of NaOH:$Na_2CO_3$=1:2 into a precursor solution mixture in which 0.0125 mol of LiF, 0.0625 mol of NaF, and 0.06875 mol of $MgCl_2.6H_2O$ were added into distilled water such that the pH of the solution became 8.5 to 10, and thus, Li—Mg precipitates were firstly produced.

Into the Li—Mg precipitates, 0.1 mol of water glass ($Na_2SiO_3$) (liquid sodium silicate No. 3 from Youngil Chemical Co.) containing 28-30 wt % of silicon dioxide was added, the pH of the resultant was adjusted to 8.5 to 10, and a second crystallization reaction was carried out for 5 hours at a temperature of 105° C. and under a pressure condition of 1 bar.

Subsequently, the precipitates formed in the crystallization reaction was washed by using distilled water and then separated into solids/liquids having moisture contents of 100% or less, and after repeating the above process one to three times, the resultant was dried and pulverized, and thus, powder-type synthetic hectorite particles were produced.

Examples 2 to 9

In example 1 above, except for using molar ratios and reaction conditions shown in Table 3 below, powder-type hectorite particles were produced by using the same method as example 1 above.

Comparative Example 1

Into 0.083 mol of water glass ($Na_2SiO_3$), 0.158 mol of nitric acid ($HNO_3$) was added to prepare 200 ml of water glass solution with pH 1, and then 0.056 mol of $MgCl_2 \cdot 6H_2O$ was dissolved into distilled water to prepare 200 ml of $MgCl_2$ solution. The water glass solution and the $MgCl_2$ solution were mixed, 100 ml of ammonia ($NH_4OH$) diluted solution were then added to manufacture Si—Mg precipitates under pH 6-8.

Subsequently, to remove excess salts, the Si—Mg precipitates were washed and then dispersed in distilled water to prepare as 400 ml of solution. Then, 100 ml of reaction solution in which 0.006 mol of $LiOH \cdot H_2O$ and 0.007 mol of NaOH were dispersed was added and a second crystallization reaction was then carried out for 6 hours under a condition of the temperature of 220° C. and the pressure of 21.7 bar.

Subsequently, the precipitates formed in the crystallization reaction was washed by using distilled water and then separated into solids/liquids having moisture contents of 100% or less, and after repeating the above process one to three times, the resultant was dried and pulverized, and thus, powder-type synthetic hectorite particles were produced.

Comparative Example 2-1

0.1 mol of water glass ($Na_2SiO_3$) was added to prepare 100 ml of water glass solution, 0.075 mol of $MgCl_2 \cdot 6H_2O$ was dissolved into distilled water to prepare 100 ml of solution, an ammonia ($NH_4OH$) solution was added to manufacture $Mg(OH)_2$ precipitates at pH 8, and then the resultant was separated into solids/liquids and washed to manufacture a $Mg(OH)_2$ solution.

A first reaction in which the water glass solution and the $Mg(OH)_2$ solution was mixed and adjusted to pH 6 to 8, and then, Si—Mg precipitates were produced for 10 minutes under a temperature of 50° C. and the atmospheric pressure.

Subsequently, to remove excess salts, the Si—Mg precipitates were washed and then dispersed in distilled water to prepare as 300 ml of solution. Then, 100 ml of reaction solution in which 0.007 mol of $LiOH \cdot H_2O$, 0.007 mol of LiCl and 0.007 mol of LiF were dispersed was added and adjusted to pH 8 to 10, and then a second crystallization reaction was carried out for 80 hours under a condition of the temperature of 90° C. and the atmospheric pressure.

Subsequently, the precipitates formed in the crystallization reaction was washed by using distilled water and then separated into solids/liquids having moisture contents of 100% or less, and after repeating the above process one to three times, the resultant was dried and pulverized, and thus, powder-type synthetic hectorite particles were produced.

Comparative Example 2-2

Powder-type hectorite particles were produced by using the same method as in comparative example 2-1, except that molar ratios and reaction conditions shown in Table 3 below were used in example 2-1 above.

Comparative Example 3

Powder-type hectorite particles were produced by using the same method as in example 1 above, except that only a strong base of NaOH was used as a basic catalyst as shown in Table 3 below in example 1 above.

Experimental Example 1

ICP Element Analysis Results

With respect to synthetic hectored prepared in examples 1, 5 and 7 described above and Laponite from BYK Co., the ICP-AES (atomic emission spectroscopy) was performed, and the results thereof is shown in Table 2.

Specifically, ICPOES Optama 8300DV form PerkinElmer was used as an analyzer, and the analysis was carried out such that: 0.01 g of a sample is added into a PTFE beaker; 2 ml of 65% nitric acid and 1 ml of 50% hydrofluoric acid were added; the resultant was heated at 100° C. to dissolve the sample; the resultant was evaporated and dried and dissolved into nitric acid; when the sample was completely dissolved, the resultant was diluted with distilled water to be 100 ml in volume; 0.03 g of the resultant was accurately measured and introduced in a ceramic boat; and then, the resultant was input to an automatic sample combustion apparatus and an analysis was carried out.

TABLE 2

| | ICP element analysis results | | | | |
|---|---|---|---|---|---|
| Identification | Si | Mg | Li | F | Na |
| BYK Co. Laponite | 8.000 | 5.714 | 0.286 | <0.01 | 0.558 |
| Example 1 | 8.000 | 5.642 | 0.358 | 0.639 | 0.579 |
| Example 5 | 8.000 | 5.521 | 0.479 | 0.509 | 0.525 |
| Example 7 | 8.000 | 5.415 | 0.585 | 0.553 | 0.333 |

Experimental Example 2

Viscosity Measurement

A 2 wt % of aqueous solution of the synthetic hectorite produced in examples 1 to 9 and comparative examples 1 to 3 were sufficiently filled in a beaker of having diameter of 4 cm or greater up to a height of 8 cm or higher, and a viscosity value measured at a speed of 50 rpm was obtained by using a viscometer DV3T (LV) from Brookfield Co. and the LV2 spindle, and the results are shown in Table 3 below.

Experimental Example 3

Light Transmittance Measurement

Light transmittance of the synthetic hectorite produced in examples 1 to 9 and comparative examples 1 and 3 was measured from a 2 wt % aqueous solution of the synthetic hectorite by using a Hazemeter HM-150 of Murakami Color Research Laboratory Co., and the results are shown in Table 3 below.

TABLE 3

| Id. | Precursor molar ratio | | | | Crystallization reaction conditions | | | | Viscosity (cP) | | Light Transmittance (%) |
| | Si | Mg | Li | F | Temperature (°C.) | Pressure (bar) | Time (hr) | Basic catalyst | 6 hr | 24 hr | Tt |
|---|---|---|---|---|---|---|---|---|---|---|---|
| Example 1 | 8 | 5.5 | 1.0 | 6.0 | 105 | 1 | 5 | Use NaOH:Na$_2$CO$_3$ 1:2 mixed base | 3.6 | 3.6 | 98.8 |
| Example 2 | 8 | 5.5 | 0.75 | 4.0 | 105 | 1 | 5 | | 397.1 | 863.8 | 96.1 |
| Example 3 | 8 | 5.5 | 1.25 | 4.0 | 105 | 1 | 5 | | 106.8 | 208.7 | 96.8 |
| Example 4 | 8 | 5.5 | 2.0 | 6.0 | 105 | 1 | 5 | | 2.4 | 3.0 | 98.4 |
| Example 5 | 8 | 5.5 | 3.0 | 6.0 | 105 | 1 | 5 | | 3.0 | 3.0 | 99.5 |
| Example 6 | 8 | 5.5 | 4.0 | 6.0 | 105 | 1 | 5 | | 3.0 | 3.6 | 99.1 |
| Example 7 | 8 | 5.5 | 5.0 | 6.0 | 105 | 1 | 5 | | 3.6 | 3.6 | 98.1 |
| Example 8 | 8 | 5.5 | 3.0 | 6.0 | 105 | 1 | 3 | | 3.0 | 3.0 | 96.2 |
| Example 9 | 8 | 5.5 | 3.0 | 6.0 | 98 | 1 | 10 | | 3.0 | 3.6 | 99.4 |
| Comparative example 1 | 8 | 5.4 | 0.6 | — | 220 | 21.7 | 6 | Use only NaOH | 18.0 | 85.2 | 91.2 |
| Comparative example 2-1 | 8 | 6 | 1.68 | 0.56 | 90 | 1 | 80 | | 15.0 | 397.1 | 81.7 |
| Comparative example 2-2 | 8 | 6 | 1.68 | 0.56 | 90 | 1 | 4 | | Precipitation occurs | Precipitation occurs | Precipitation occurs |
| Comparative example 3 | 8 | 5.5 | 3.0 | 6.05 | 105 | 1 | 5 | | Precipitation occurs | Precipitation occurs | Precipitation occurs |

*Precipitation occurs: Due to insufficient crystallization reaction, precipitation occurs in aqueous solution, and thus, measurement of physical properties was impossible
*Tt: Total transmittance (%)

As shown in Table 3, it could be understood that by using the preparing method of the present invention, in which a Li—Mg precipitate formation step was introduced, synthetic hectorite could not only be produced under a low-temperature/atmospheric pressure condition but also be produced in a remarkably reduced time of 10 hours or shorter by adding and using a strong base and a weak base, and a 2 wt % aqueous solution of synthetic hectorite produced by using the preparing method of the present invention had an effect of having light transmittance of 95% or higher to thereby have an excellent water dispersibility and enabling a viscosity control.

More specifically, it could be understood that by using the preparing method of examples 1 to 9 of the present invention, reactions could progress at a lower temperature and pressure than in the high-temperature/high-pressure preparing method in related arts, and thus, there was an advantageous effect in terms of low process costs and stability, and it could also be understood that prepared synthetic hectorite had a higher light transmittance and dispersibility than that in comparative example 1 and enabled a viscosity control according to application usages.

Meanwhile, it could be understood that in comparative example 2-1, in which synthetic hectorite was prepared under a low-pressure/atmospheric-pressure condition without introducing a step of forming Li—Mg precipitates, synthetic hectorite was produced, but the transmittance thereof is remarkably decreased and the reaction time was 80 hours, increased even up to 2 times approximately.

In comparative example 2-2 in which the same preparing method as that in comparative example 2-1 was used, but the reaction time was reduced to 40 hours, it could be confirmed that since a sufficient reaction was not carried out, precipitates occurred in the aqueous solution, the viscosity control was thereby impossible, and measurement of other major properties were impossible.

Meanwhile, it could be understood that in comparative example 3, in which a step of forming Li—Mg precipitates was introduced, but as a basic catalyst, only sodium hydroxide was used as a strong base without adding and using sodium carbonate as a weak base, a crystallization reaction could not smoothly progress due to a too high pH and precipitates were thereby generated, so that it was impossible to control viscosity and measure major properties.

As such, it could be confirmed that in the method of preparing synthetic hectorite according to the present invention, a step of forming Li—Mg precipitates was introduced, and a weak base was added and used when the Li—Mg precipitates were formed, so that a reaction time could be remarkably used even under a low-temperature/atmospheric-pressure condition, synthetic hectorite with an excellent properties may be obtained, and synthetic hectorite having easily controllable properties could be prepared by controlling the molar ratio of Li and F.

The above descriptions of the present invention have been provided as examples. Any one skilled in the art belonging to the present invention would well understand that the present invention may be easily modified into a specific form without changing the technical sprit and indispensable features. Therefore, embodiments described so far should be construed as nonrestrictive but exemplary in all respects.

The invention claimed is:

1. A method for producing synthetic hectorite, the method comprising the steps of:
   1) preparing a precursor solution mixture including a lithium (Li) precursor, a fluorine (F) precursor, and a magnesium (Mg) precursor, wherein a molar ratio of the lithium precursor to the fluorine precursor is 1:1 to 1:10;

2) adding a basic catalyst into the precursor solution mixture and forming a Li—Mg precipitate, wherein: the basic catalyst is a mixture of a strong base and a weak base and the strong base and the weak base are added in a molar ratio of 1:2 to 1:10; and 3) adding a silica (Si) precursor to the Li—Mg precipitate and carrying out a crystallization reaction at a temperature of 70° C. to 120° C. under a pressure of 1 bar to 1.21 bar for 3 hours to 10 hours.

2. The method for producing synthetic hectorite of claim 1, wherein the strong base is one or more selected from the group consisting of sodium hydroxide (NaOH), potassium hydroxide (KOH), calcium hydroxide ($Ca(OH)_2$), and barium hydroxide ($Ba(OH)_2$), and the weak base is one or more selected from the group consisting of ammonium hydroxide ($NH_4OH$), sodium carbonate ($Na_2CO_3$), and magnesium hydroxide ($Mg(OH)_2$).

3. The method for producing synthetic hectorite of claim 1, wherein the basic catalyst is added in an amount of causing a pH of the precursor solution mixture to be 7 to 10.

4. The method for producing synthetic hectorite of claim 1, wherein the silica precursor and the magnesium precursor are added in a molar ratio of 2:1 to 1:1.

5. The method for producing synthetic hectorite of claim 1, wherein a washing or filtering step is not carried out prior to the crystallization of step 3).

6. The method for producing synthetic hectorite of claim 1, wherein the lithium precursor is one or more selected from the group consisting of lithium fluoride (LiF), lithium hydroxide (LiOH), lithium chloride (LiCl), lithium carbonate ($Li_2CO_3$), and lithium sulfate ($Li_2SO_4$).

7. The method for producing synthetic hectorite of claim 1, wherein the fluorine precursor is one or more selected from the group consisting of hydrofluoric acid (HF), sodium fluoride (NaF), fluosilicic acid ($(H_3O)_2[SiF_6]$), and sodium silico fluoride ($Na_2[SiF_6]$).

8. The method for producing synthetic hectorite of claim 1, wherein the magnesium precursor is one or more selected from the group consisting of magnesium carbonate ($MgCO_3$), magnesium sulfate ($MgSO_4$), magnesium chloride ($MgCl_2$), and magnesium hydroxide ($Mg(OH)_2$).

* * * * *